Sept. 28, 1965     K. L. COPELAND     3,208,329
SAFETY BOLT
Filed Sept. 26, 1963
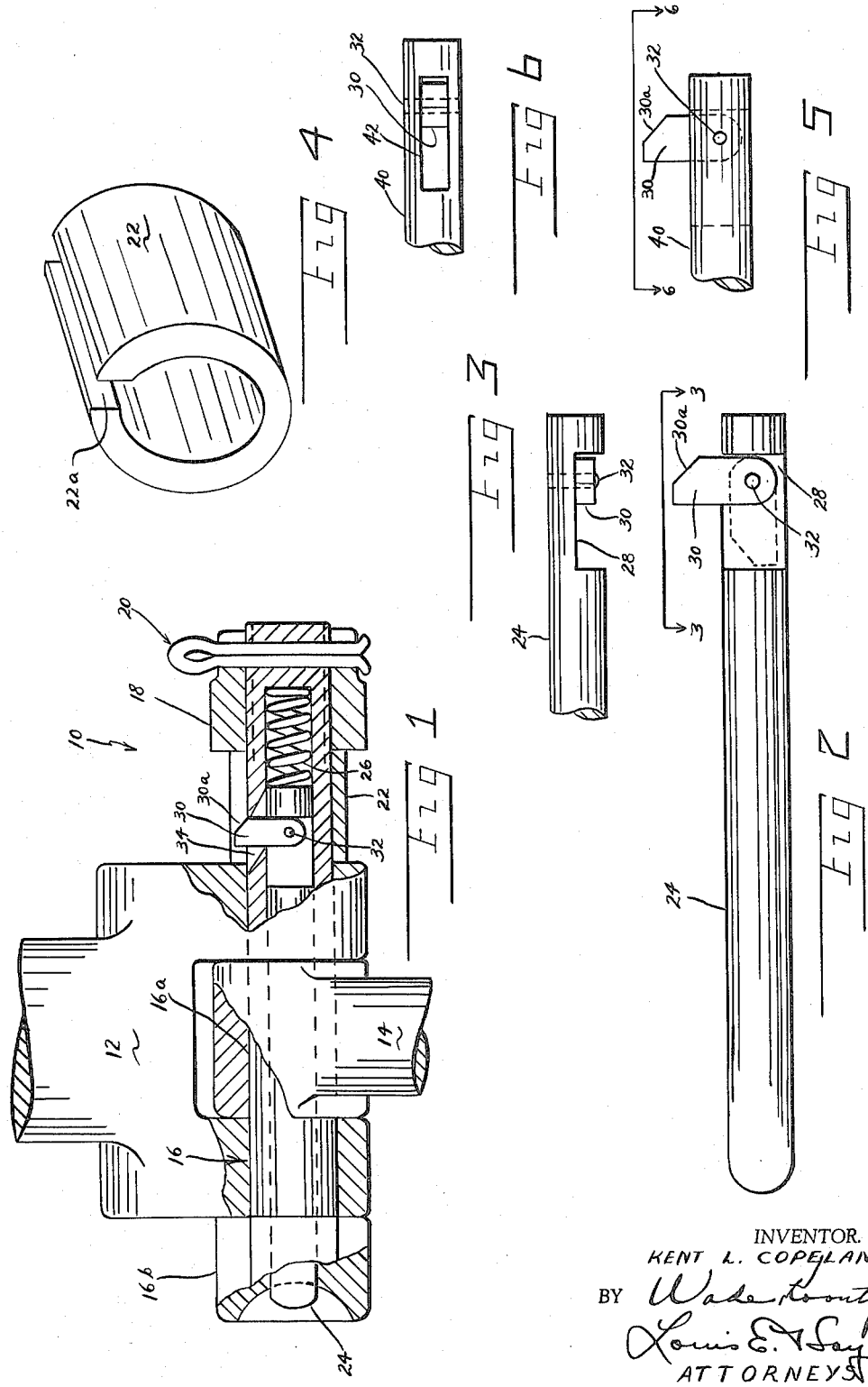
INVENTOR.
KENT L. COPELAND
BY
ATTORNEYS 3,208,329
SAFETY BOLT
Kent L. Copeland, 130 Lisa Lane, Yellow Springs, Ohio
Filed Sept. 26, 1963, Ser. No. 311,927
1 Claim. (Cl. 85—3)
(Granted under Title 35, U.S. Code (1952), sec. 266)

The invention described herein may be manufactured by or for the Government for governmental purposes without the payment to me of any royalty thereon.

This invention relates to retainer bolts and, more specifically, to retainer bolts having releasable means for preventing accidental loss of the bolt when the retaining nut on the bolt becomes detached. Bolts of the class to which this invention pertains are often used in critical applications for detachably joining machine elements from which they must periodically be removed. An example of such an application is on the actuating linkage of the flight control system used on an aircraft.

Such linkage must periodically be disconnected in order to make checks and adjustments to the linkage systems. Bolts joining link elements must be separable; yet provision must be made to safeguard against the accidental loss of a bolt which would incapacitate the control system with the resulting loss of the aircraft.

In the past, many safety bolt devices have used small spring and wire forms bent into various shapes. Many of these spring forms are formed in forming dies and have stress concentrations which result in spring failure while in service. Often the spring forms are of fine spring wire and so located on the safety bolt that they become lost during normal handling.

One object of the present invention is to provide a safety bolt using a simple compression spring contained within the bolt.

Another object of the present invention is to provide a safety bolt easily actuatable by one hand at the head end of the bolt.

A further object of the present invention is to provide a safety bolt offering the greatest protection against loss in case of spring failure.

Yet another object of the present invention is to provide a safety bolt without detachable external elements.

Additional objects, advantages and features of the invention reside in the construction, arrangement and combination of parts involved in the embodiment of the invention as will appear from the following description and accompanying drawing, wherein:

FIG. 1 is a side view of the safety bolt joining two linkage elements and partially in section to show working details of the various elements;

FIG. 2 is an enlarged side elevation of the plunger rod with attached retaining tab;

FIG. 3 is a plan view of the tab end of the plunger rod taken along line 3—3 on FIG. 2;

FIG. 4 is an enlarged perspective of the split sleeve;

FIG. 5 is a side elevation, similar to FIG. 2, and showing the tab end of a second embodiment of the invention; and FIG. 6 is a plan view, similar to FIG. 3, taken along line 6—6 on FIG. 5.

Referring to FIG. 1, the safety bolt, referred to in its entirety as safety bolt 10, is shown pivotally passing through bores and joining two linkage elements 12 and 14. The safety bolt 10 has a body 16 having an elongated cylindrical shank 16a threaded at one end and having a head 16b at the opposite end. The body 16 is retained in position by means of a nut 18 engaging the threaded end of shank 16a. The nut may be locked in place by means of a cotter pin 20. Disposed between the face of nut 20 and the adjacent face of link element 12 is split sleeve 22. The construction and purpose of split sleeve 22 will be more fully described hereinafter.

Axially operable within body 16 is a plunger rod 24 which engages a bore within body 16. The bore within body 16 is blind at the forward or threaded end of the body; the bottom of the bore providing support for the contained compression spring 26 which engages the forward end of plunger rod 24 and biases the plunger rod rearward. As best shown on FIG. 2 and FIG. 3, a transverse slot 28 is milled into the side of plunger rod 24 near the forward end thereof, so as to be proximate to slot 34 in the cylindrical shank of body 16, when the plunger rod is in its normal operating position shown on FIG. 1. A retaining tab 30 is pivotally joined to the bottom face and at the forward end of transverse slot 28 by means of pin 32. The transverse slot is made long enough for the retaining tab to retract or fold to the dotted position shown on FIG. 2. When the retaining tab is in the extended position shown on FIG. 1, the tab extends outwardly from body 16 through a passage such as slot 34 cut into the cylindrical shank 16a to extend from the periphery of the shank to the bore which houses plunger rod 24. The slot 34 is inclined rearwardly at any convenient angle with the longitudinal axis through body 16, so that the outer opening of the slot is rearward from the inner opening thereto. In addition to being inclined rearwardly, the slot 34 is made sufficiently wider in the longitudinal direction on the shank, than is the retaining tab 30, to permit the retaining tab to pivot inward about pin 32 as the plunger rod 24 is depressed against the compression spring 26 until the free end of the retaining tab completely pivots out of engagement with slot 34 to be within the confines of the plunger rod.

Split sleeve 22, which may be of any convenient length, has an inside diameter permitting free passage onto the shank portion of the body, and contains a linear slot 22a for loosely straddling the retaining tab 30. Since, as best shown on FIG. 3, the retaining tab 30 is not coaxial with plunger rod 24, the linear slot 22a in split sleeve 22 is likewise laterally displaced a proper amount to accommodate the retaining tab 30. The split sleeve 22 serves primarily as a spacer washer having a slot to prevent interference with the operation of the retaining tab and to provide protection from external physical damage to the tab which is short enough to remain within the confines of the split sleeve. It is apparent that the split sleeve 22 could be placed onto the shank of the body and the nut tightened without the retaining tab engaging the slot in the sleeve. The sleeve would engage the chamfered edge 30a of the retaining tab and force it downward into slot 34 while moving the plunger rod 24 forward against the compression spring 26. It is thus seen that the linear slot 22a in split sleeve 22 has a second useful function; namely, it provides a visible means for assuring that the retaining tab extends from the body as shown on FIG. 1. After the cotter pin, the nut and the split sleeve have been removed, the balance of the safety bolt may be withdrawn from the linkage by pressing inward on the protruding end of the plunger rod 24 until the retaining tab 30 is retracted into body 16 by a sufficient amount to clear the periphery of the cylindrical shank 16a, thus permitting the shank to be withdrawn.

The safety bolt may readily be inserted into position. After the retaining tab makes contact with the leading face on linkage element 12 and further forward pressure is exerted on the head of the body, the retaining tab retracts into the shank of the body. As soon as the retaining tab clears the far end of the bore through the linkage elements, the compression spring, acting on the end of the plunger rod, causes the retaining tab to "pop out" to the position shown on FIG. 1.

The safety bolt will continue to remain engaged and cannot be accidentally removed or lost, so long as the retaining tab is in the extended position as shown on FIG. 1. The retaining tab is biased against the forward edge of the transverse slot 28 in the plunger rod, and is further biased against the rear edge of slot 34 in the shank of the body, thus holding the retaining tab in fixed lateral position to the longitudinal axis of the shank of the body. Even in the extremely rare event when a compression spring breaks, the safety bolt would not easily become withdrawn by accident. If the linkage is in such position that the head is top side, the safety bolt would be held in place by gravity. If the linkage were such that the head of the safety bolt were at the bottom, the safety bolt would not become detached since the bolt would hang on the retaining tab. If the linkage were such that the bolt is in a horizontal position, in order for the safety bolt to become detached, the plunger rod 24 would first have to work forward to permit the retaining tab to retract into the body, and then the entire safety bolt would have to work its way out of the bore through the linkage. The likelihood of this occurring is nil, even in the horizontal position; considering the probability against the tab being in the most favorable vertical position shown.

The safety bolt may easily be assembled by inserting the plunger rod 24 with attached retaining tab 30 into the bore in the body 16. The retaining tab will assume the approximate position shown dotted on FIG. 2. With the body 16 held to put the slot 34 at the bottom, gravity will permit the nonpivoted end of the retaining tab to pass through the slot.

Head 16b of body 16 may take any desired form without departing from the invention. The head may be in the hexagon form shown, may be a round flat head, or any other convenient form. Likewise, the head may be dished, as shown, to protect the end of the plunger rod; or, the plunger rod may be made flush or may protrude from the bolt head.

A second embodiment of this invention uses a modified plunger rod as shown on FIG. 5 and FIG. 6. The modified plunger rod 40 is identical with the plunger rod 24, except that a slot 42 is broached through the plunger rod to be within the rod and symmetrical on the center line thereof. Slot 42 on plunger rod 40 is substituted for the transverse slot 28 on plunger rod 24. Slot 42 slidably receives and gives side support to the retaining tab 30 which is pivotally joined thereto by pin 32. The linear slot 22a on split sleeve 22 is placed on the centerline to correspond with the centerline location of retaining tab 30 on plunger rod 40.

It is to be understood that the embodiments of the present invention as shown and described are to be regarded as illustrative only and that the invention is susceptible to variations, modifications and changes within the scope of the appended claim.

I claim:

A safety bolt for detachably uniting adjacent machine elements having coaxial bores on a pivot axis formed by said safety bolt comprising: a body having a circular shank threaded at one end and having a head at the opposite end, the circular shank of said body being adapted for extending through and protruding from the coaxial bores in the machine elements, said body having a blind axial bore open at the head end and longitudinally extending into the protruding end of said body, and further having an axially extending slot extending between the axial bore and the periphery of the protruding circular shank of said body, the end walls of the slot being rearwardly inclined toward the head with the outer opening rearward from the inner opening and longitudinally located on the shank of said body to be externally proximate to the adjacent machine element; a split sleeve for passing over the protruding end of the circular shank of said body to abut against the adjacent machine element, said split sleeve having a linear slot defined by two parallel side walls axially extending the full length through the sidewall of said split sleeve; a removable nut engaging the threaded circular shank of said body with said split sleeve disposed between said nut and the adjacent machine element; a plunger rod actuatable within the axial bore of said body, said plunger rod having an elongated slot longitudinally located to be proximate to the slot in the circular shank of said body; a retaining tab movably extending from the slot in the circular shank of said body to laterally extend beyond the bore in the adjacent machine element to visibly engage the linear slot within the confines of said split sleeve and having the inner end thereof pivotally joined to said plunger rod to be contained within the forward end of the elongated slot on said plunger rod for pivotal rotation on an axis normal to the longitudinal axis of said plunger rod, the elongated slot in said plunger rod having end walls longitudinally located on said plunger rod in relationship to the pivot axis of said retaining tab to permit said retaining tab to pivot inward to be within the confines of the elongated slot in said plunger rod and to pivot outward to the extended position through the slot in the circular shank of said body against the adjacent end wall at substantially 90° to the longitudinal axis of said plunger rod preventing any appreciable longitudinal movement or withdrawal of the circular shank of said body from the bores in the machine elements when said nut is not in engagement with said body; and a compression spring within and acting between the bottom of the blind axial bore in said body and the adjacent end of said plunger rod biasing said retainer tab into fixed lateral position against the forward end of the elongated slot in said plunger rod and the rear end of the slot in the circular shank of said body; the slot in the circular shank of said body being of such length greater than the width of said retaining tab between the inclined end walls thereof whereby rotation of said retaining tab beyond substantially 90° from the longitudinal position in said plunger rod is prevented while having sufficient length to permit said retaining tab to pivot inward when said plunger rod is depressed forward against said compression spring until the free end of said retaining tab pivots out of engagement with the slot to be within the confines of said plunger rod.

References Cited by the Examiner

UNITED STATES PATENTS

| | | | |
|---|---|---|---|
| 1,433,410 | 10/22 | Passauer | 85—3 |
| 2,470,498 | 5/49 | Lankford | 85—3 |
| 2,906,311 | 9/59 | Boyd | 151—9 |

FOREIGN PATENTS 906,832  9/62  Great Britain.

CARL W. TOMLIN, *Primary Examiner.*

EDWARD C. ALLEN, DONLEY J. STOCKING,
*Examiners.*